United States Patent
Khawand

(10) Patent No.: US 9,867,020 B2
(45) Date of Patent: Jan. 9, 2018

(54) PRE-DETERMINED RESPONSES FOR WIRELESS DEVICES

(75) Inventor: Charbel Khawand, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 209 days.

(21) Appl. No.: 12/210,958

(22) Filed: Sep. 15, 2008

(65) Prior Publication Data

US 2010/0069043 A1    Mar. 18, 2010

(51) Int. Cl.
| | |
|---|---|
| *H04W 4/12* | (2009.01) |
| *H04W 4/16* | (2009.01) |
| *H04M 3/533* | (2006.01) |
| *H04M 3/42* | (2006.01) |
| *H04W 88/02* | (2009.01) |
| *H04M 1/663* | (2006.01) |

(52) U.S. Cl.
CPC ......... *H04W 4/16* (2013.01); *H04M 3/42195* (2013.01); *H04M 3/42382* (2013.01); *H04M 3/53341* (2013.01); *H04M 1/663* (2013.01); *H04M 2201/36* (2013.01); *H04W 4/12* (2013.01); *H04W 88/02* (2013.01)

(58) Field of Classification Search
CPC .... H04L 51/38; H04L 2463/061; H04W 4/08; H04W 4/12; H04W 4/16; H04W 88/02; H04W 48/16; H04W 4/18; H04M 3/420933; H04M 3/42365; H04M 2201/38; H04M 2203/2044; H04M 2242/04; H04M 1/72519; H04M 2207/18; H04M 1/72552; H04M 3/553; H04M 3/42042; H04M 2203/651; H04M 15/06; H04M 3/42068

USPC ............... 455/412.1, 418; 379/67.1, 80
See application file for complete search history.

(56) References Cited

U.S. PATENT DOCUMENTS

| | | | |
|---|---|---|---|
| 5,991,367 A | 11/1999 | Robuck | |
| 6,253,075 B1 | 6/2001 | Beghtol et al. | |
| 6,680,935 B1 | 1/2004 | Kung et al. | |
| 7,010,288 B2 * | 3/2006 | Brown et al. | 455/412.1 |
| 7,302,280 B2 | 11/2007 | Hinckley et al. | |

(Continued)

FOREIGN PATENT DOCUMENTS

| | | |
|---|---|---|
| CN | 101044776 | 9/2007 |
| JP | 200032122 | 1/2000 |

(Continued)

OTHER PUBLICATIONS

Nelson, et al, "Quiet Calls: Talking Silently on Mobile Phones", Retrieved at<<http://delivery.acm.org/10.1145/370000/365094/p174-bly.pdf?key1=365094&key2=2083926121&coll=GUIDE&dl=portal,ACM&CFID=37041316&CFTOKEN=67454480>>, SIGCHI'01, Mar. 31-Apr. 4, 2001, Seattle, WA, USA., vol. No. 3, Issue No. 1, pp. 174-181.

(Continued)

Primary Examiner — Olumide T Ajibade Akonai

(57) ABSTRACT

In accordance with one or more aspects, criteria including both a type of communication and a user signal are received. Additionally, a response to be stored as a pre-determined response is received. Both the criteria and the response are stored. When a communication satisfying the criteria (both the type of communication and the user signal) is subsequently received, the pre-determined response is sent to the device from which the communication is received.

20 Claims, 4 Drawing Sheets

(56) References Cited

U.S. PATENT DOCUMENTS

| | | | |
|---|---|---|---|
| 8,081,963 B2* | 12/2011 | Aftab et al. | 455/419 |
| 8,712,033 B2 | 4/2014 | Ganganna | |
| 2001/0011014 A1* | 8/2001 | Higuchi et al. | 455/412 |
| 2002/0050980 A1* | 5/2002 | Furuki et al. | 345/168 |
| 2002/0142756 A1 | 10/2002 | Rutledge et al. | |
| 2002/0181671 A1 | 12/2002 | Logan | |
| 2003/0003926 A1 | 1/2003 | Peters et al. | |
| 2003/0120732 A1* | 6/2003 | Couts et al. | 709/206 |
| 2004/0059794 A1 | 3/2004 | Karaoguz et al. | |
| 2005/0124324 A1* | 6/2005 | Thomas et al. | 455/412.1 |
| 2006/0211447 A1 | 9/2006 | Purkayastha et al. | |
| 2007/0072602 A1* | 3/2007 | Iyer et al. | 455/426.1 |
| 2007/0149231 A1 | 6/2007 | Khawand et al. | |
| 2007/0177559 A1 | 8/2007 | Jain et al. | |
| 2007/0238474 A1* | 10/2007 | Ballas et al. | 455/466 |
| 2007/0268274 A1 | 11/2007 | Westerman et al. | |
| 2008/0037744 A1* | 2/2008 | Fux et al. | 379/201.01 |
| 2008/0048990 A1 | 2/2008 | Cho et al. | |
| 2008/0056454 A1* | 3/2008 | Lahtiranta | H04M 1/642 379/67.1 |

FOREIGN PATENT DOCUMENTS

| | | |
|---|---|---|
| JP | 2003125453 | 4/2003 |
| JP | 2006324911 | 11/2006 |
| JP | 2007208636 | 8/2007 |
| KR | 20060040981 | 5/2006 |
| KR | 20070001462 | 1/2007 |
| KR | 1020070029338 | 3/2007 |
| KR | 1020070060329 | 6/2007 |

OTHER PUBLICATIONS

Feijs, et al, "Design and Semantics of Form and Movement", Retrieved at<<http://www.cfdr.co.uk/desform07/downloads/2006proceedings.PDF#page=86>>, DeSForM 2006, pp. 164.

Pering, "Taming of the Ring: Context Specific Social Mediation for Communication Devices", Retrieved at<<http://delivery.acm.org/10.1145/510000/506560/p712-pering.pdf?key1=506560&key2=7572926121&coll=portal&dl=ACM&CFID=37039645&CFTOKEN=44069288>>, CHI 2002, Apr. 20-25, 2002, Minneapolis, Minnesota, USA., pp. 712-713.

Ronkainen, et al, "Tap Input as an Embedded Interaction Method for Mobile Devices", Retrieved at<<http://delivery.acm.org/10.1145/1230000/1227023/p263-ronkainen.pdf?key1=1227023&key2=6992926121&coll=GUIDE&dl=GUIDE&CFID=37040118&CFTOKEN=99611076>>, TEI'07, Feb. 15-17, 2007, Baton Rouge, LA, USA, pp. 263-270.

"Nokia E61", Retrieved at <<http://www.softwaremarket.nokia.com/?action=productDetails&pID=1511&uaid=229&lang=en>>, Jul. 18, 2008, pp. 1-2.

"PCT Search Report and Written Opinion", Application No. PCT/US2009/056978, (dated Apr. 22, 2010),11 pages.

"Foreign Office Action", CN Application No. 200980136916.7, dated Jan. 8, 2014, 9 pages.

"Foreign Office Action", Chinese Application No. 200980136916.7, (dated Aug. 19, 2013), 11 Pages.

"Foreign Office Action", Japanese Application No. 2011-527042, (dated Jun. 20, 2013), 5 pages.

"Foreign Office Action", Chinese Application No. 200980136916.7, (dated Apr. 3, 2013), 11 pages.

"Office Action Issued in Korean Patent Application No. 10-2011-7005831", dated Feb. 19, 2016, 4 Pages.

"Notice on Reexamination", CN Application No. 200980136916.7, dated Jun. 4, 2015, 12 Pages.

"Foreign Office Action", KR Application No. 10-2011-7005831, dated Aug. 7, 2015, 6 pages.

"Foreign Office Action", KR Application No. 10-2011-7005831, dated Oct. 25, 2016, 4 pages.

"Foreign Office Action", CN Application No. 200980136916.7, dated Apr. 2, 2014, 9 Pages.

"Extended European Search Report", EP Application No. 09813794.6, dated Mar. 28, 2017, 6 pages.

"Foreign Office Action", KR Application No. 10-2011-7005831, dated Apr. 20, 2016, 5 pages.

* cited by examiner

PRE-DETERMINED RESPONSES FOR WIRELESS DEVICES

BACKGROUND

Wireless devices have become commonplace, allowing users to communicate with one another via voice calls as well as messages (e.g., text messages and/or multimedia messages). Despite their popularity, problems remain with such wireless devices. One such problem is that it is sometimes difficult for a user to quickly and easily respond to a particular voice call or message. For example, if the user is in a meeting and receives a voice call or message, it can be difficult for the user to respond to that message or call. This degrades from the user experience and usefulness of the wireless devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, criteria including a type of communication and a user signal are received. Additionally, a response to be stored as a pre-determined response is received. Both the response and the criteria are stored for subsequent sending of the response when a communication and user signal satisfying the criteria are received.

In accordance with one or more aspects, a first wireless device receives a communication of a first type from a second device. A first signal is received from a user of the first wireless device, and a pre-determined response to the communication is identified based at least in part on both the first type and the first signal. The pre-determined response is sent to the second device.

BRIEF DESCRIPTION OF THE DRAWINGS

The same numbers are used throughout the drawings to reference like features.

DETAILED DESCRIPTION

Pre-determined responses for wireless devices are discussed herein. A user can identify different pre-determined responses to be sent in response to particular types of received communications. The user can also identify different signals to indicate different responses. When a communication such as a voice call or a text message is received at the user's device, the user can input a particular signal, such as pressing a particular key or inputting a particular command on a touch screen. In response to this user signal, a corresponding pre-determined response is sent to the device from which the communication was received. The user can associate different pre-determined responses with different user signals, and the same user signal can be used to identify different pre-determined responses for different types of received communications. Accordingly, the particular pre-determined response that is sent to the device from which the communication was received is dependent on both the type of communication received and the user signal that is received.

Figure 1:
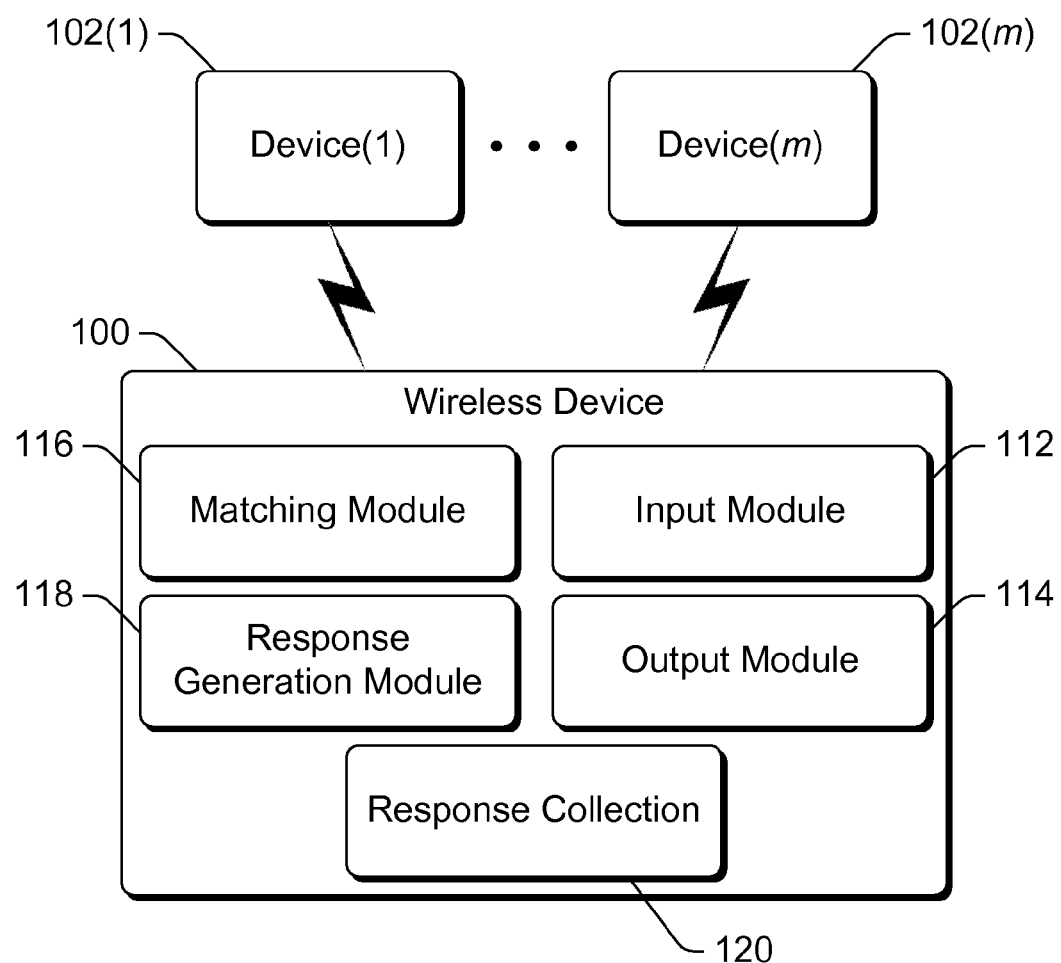
FIG. 1 is a block diagram illustrating an example wireless device implementing the pre-determined responses for wireless devices in accordance with one or more embodiments.

FIG. 1 is a block diagram illustrating an example wireless device 100 implementing the pre-determined responses for wireless devices in accordance with one or more embodiments. Wireless device 100 can be any of a variety of devices capable of wireless communication with one or more other devices 102(1), . . . , 102(m). In one or more embodiments, devices 102 are wireless devices, although alternatively one or more of devices 102 are not wireless devices. Devices 100 and 102 being wireless refers to the ability of the devices to communicate with one or more other devices using any of a variety of different wireless communication media. For example, device 100 can be a cellular or other wireless phone, a personal digital assistant (PDA), a handheld computer, a game console, an automotive computer, and so forth. Device 100 can communicate with devices 102 via any of a variety of communication networks, including a cellular or other wireless phone network, a satellite network, the Internet, a local area network (LAN), a public telephone network, an intranet, other public and/or proprietary networks, combinations thereof, and so forth.

Device 100 includes an input module 112, an output module 114, a matching module 116, a response generation module 118, and a response collection 120. Input module 112 and output module 114 manage the receiving of communications from and sending of communications to devices 102. These communications can be of different types. One type of such communication is a typical voice phone call, also referred to as voice communication. Another type of such communication is message communication, such as messages including text or other media. Such message communication can be, for example, messages in accordance with an SMS (Short Message Service) protocol, an MMS (Multimedia Messaging Service) protocol, a mobile instant messaging protocol, and so forth.

Response generation module 118 facilitates generation of the pre-determined responses as well as establishing of the criteria under which the pre-determined responses are to be sent to a device 102. As discussed in more detail below, these criteria include a type of communication received from a device 102 as well as a signal received from a user of device 100. Once generated, these pre-determined responses and their corresponding criteria are maintained in response collection 120. The responses to communications are generated before the communications are received by device 100, and thus are referred to as "pre-determined" responses.

Responses and their corresponding criteria are typically generated at device 100. Alternatively one or more responses and corresponding criteria can be generated at another device and communicated to device 100. By way of example, a response generation module could be included in another device (e.g., a desktop computer, a laptop computer, a server computer, etc.), and the user could use this other device to generate responses and corresponding criteria. These generated responses and corresponding criteria can then be communicated to response generation module 118 of device 100, which stores the received responses and corresponding criteria in response collection 120.

Matching module 116 analyzes communications received via input module 112, checks whether any of the criteria in collection 120 are satisfied, and identifies the corresponding pre-determined response in the event that the criteria are satisfied. Such an identified response is returned by output module 114 to the device 102 from which the communication was received. The manner in which output module 114 determines the device 102 from which the communication was received can vary. For example, a communication path or connection may be inherent in the communication process (e.g., in the case of a voice call), and device 100 can determine that the device from which the communication was received is the device at the other end of that communication path or connection. By way of another example, metadata of the communication received may identify the device 102 (e.g., a phone number of device 102 may be included as metadata in a received message).

Each pre-predetermined response can take a variety of different forms. In one or more embodiments the pre-determined response is a voice response. This voice response is, for example, an audible response generated by the user. By way of example, the user could record a voice response of "I'm in a meeting, I'll call you back as soon as I'm finished" as the voice response, or "Put me on your do not call list" as the voice response. It is to be appreciated that these voice responses are only examples, and that any of a variety of different voice responses can be used as desired by the user of device 100.

In one or more other embodiments, the pre-determined response is a message response, such as an SMS protocol message response, an MMS protocol message response, a mobile instant messaging message response, and so forth. This message response can be a text and/or other media response generated by the user via response generation module 118. By way of example, the user could input a text response of "In meeting—will call you back when done" as the message response, or select an image of a stack of papers and input a text response of "Busy—will get back with you as soon as I can" as the message response. It is to be appreciated that these message responses are only examples, and that any of a variety of different message responses can be used as desired by the user of device 100.

The pre-determined responses are discussed above as being generated by the user. However, in alternate embodiments the pre-determined responses can be generated by another user or component and obtained by response generation module 118. For example, one or more previously generated voice or message responses can be retrieved by response generation module 118 and selected by the user. Such selected responses can be used in the same manner as the user-generated responses.

The criteria includes both a type of communication received and a user signal received. These different criteria allow the user of device 100 to generate different pre-determined responses that correspond to different user signals, and thus allow the user to select a particular pre-determined response by inputting the appropriate signal. These different criteria also allow the user of device 100 to generate different pre-determined responses for different types of received communications, thus allowing the user to have a particular pre-determined response returned based on the type of received communication.

The type of communication received can take a variety of different forms. Any type of communication that device 100 can receive can be used as part of the criteria. In one or more embodiments, one type of communication is voice communication, such as a live or recorded voice. A voice communication can be, for example, a phone call from a user of a device 102, a phone call from an automated system playing a previously recorded audio message, a voice call from a user of a device 102 using a walkie-talkie or "push-to-talk" feature, and so forth. Additionally, in one or more embodiments, one type of communication is a message communication, such as an SMS protocol message, an MMS protocol message, a mobile instant messaging protocol message, and so forth. These different message communication protocols can be part of the same communication type, such as a message communication type. Alternatively, one or more of these different message communication protocols can be different communication types, such as an SMS message communication type, an MMS message communication type, a mobile instant messaging communication type, and so forth.

The user signal can be an input received via one or more of a variety of different input mechanisms supported by device 100. By way of example, the user signal can be selection of one or more physical buttons or keys of device 100, selection of one or more buttons displayed via a screen of device 100 (e.g., selected via a touchscreen), a particular input via a touchscreen of device 100 (e.g., a single tap of the touchscreen, tapping the touchscreen twice in quick succession, inputting a particular symbol such as an "X" on the touchscreen, etc.), a particular physical feedback input to the device (e.g., tapping any portion of device 100 or another action that can be recognized by a motion detection component of device 100, shaking a device, rotating a device having a gyroscope, etc.), and so forth.

When a communication is received at device 100, device 100 notifies the user of the received communication. This notification can be done in a variety of different manners, such as playing an audible notification (e.g., music, a ring tone, etc.), vibrating the device, flashing a light of the device, displaying an identifier of the device or other user from which the communication was received, and so forth. Traditionally, the user of device 100 could respond to this notification by pressing one or more buttons on device 100 or performing other actions to answer the voice call or view the message. With the pre-determined responses for wireless devices discussed herein, the user is able to input a user signal to allow the user to respond to the communication with one of the pre-determined responses.

As discussed above, the criteria corresponding to a particular pre-determined response includes both a type of communication received and a user signal received. Thus, the same user signal (e.g., a tapping of device 100, inputting a symbol such as an "X" on the touchscreen, and so forth) can be used for different types of communication received in order to cause different pre-determined responses to be returned to the device from which the communication was received. For example, if a voice call is received and the user inputs an "X" on a touchscreen of device 100, these two criteria can correspond to an "I'm in a meeting, I'll call you back as soon as I'm finished" voice response that is returned. However, if a text message is received and the user inputs an "X" on a touchscreen of device 100, these two criteria can correspond to an "In meeting—will call you back when done" message response that is returned.

Additionally, different user signals can be used for the same type of communication received in order to cause different pre-determined responses to be returned to the device from which the communication was received. For example, if a text message is received and the user inputs an "X" on a touchscreen of device 100, these two criteria can correspond to an "In meeting—will call you back when done" text message response that is returned. However, if a text message is received and the user taps a particular button of device 100 two times in quick succession, these two criteria can correspond to an image of a stack of papers and input a text response of "Busy—will get back with you as soon as I can" message response that is returned.

Response generation module 118 facilitates establishing the criteria under which pre-determined responses are to be sent. Response generation module 118 can obtain the criteria from a user of device 100 via any of a variety of different mechanisms. In one or more embodiments, module 118 displays or otherwise presents a user interface to the user, allowing the user to input the desired criteria. This user interface can present possible criteria to the user and allow the user to select from the presented criteria, or alternatively can allow the user to input (e.g., verbally, using text, etc.) the desired criteria. By way of example, different types of communication that a device supports as well as different user signals that the device supports can be displayed to the user, and the user can enter the criteria by selecting ones of these displayed types of communication and user signals.

By way of another example, different types of communication that a device supports can be displayed to the user and the user can select one of those types of communication. In addition, the user can input the particular user signal that he or she desires to use as part of the criteria, such as by pressing a particular key of device 100, making a symbol on a touchscreen of device 100 using his or her finger, tapping device 100, and so forth. Optionally a "begin record" key or button can be selected to indicate to module 118 that the user is about to begin inputting the desired user signal, and then an "end record" key or button can be selected to indicate to module 118 that the user has completed inputting the desired user signal. Module 118 senses and records any keys, buttons, motions, etc. input by the user between selection of the "begin record" key or button and selection of the "end record" key or button, and uses the sensed inputs as the desired user signal.

Response generation module 118 also facilitates the generation of the pre-determined responses. In one or more embodiments, module 118 displays or otherwise presents a user interface to the user allowing the user to input or select the pre-determined responses. The user can input or author the pre-determined responses himself or herself, such as by entering the text for a message response, entering the voice or other audio for a voice response, selecting a graphic or image for a message response, and so forth. The user can also optionally select from one or more responses generated by another user, administrator, or developer, and use the selected response as the pre-determined response. For example, the user could retrieve a response from another device (e.g., from a server via the Internet), the user could select from one or more responses stored on device 100 by a developer, manufacturer, or seller of device 100, and so forth.

Figure 2:
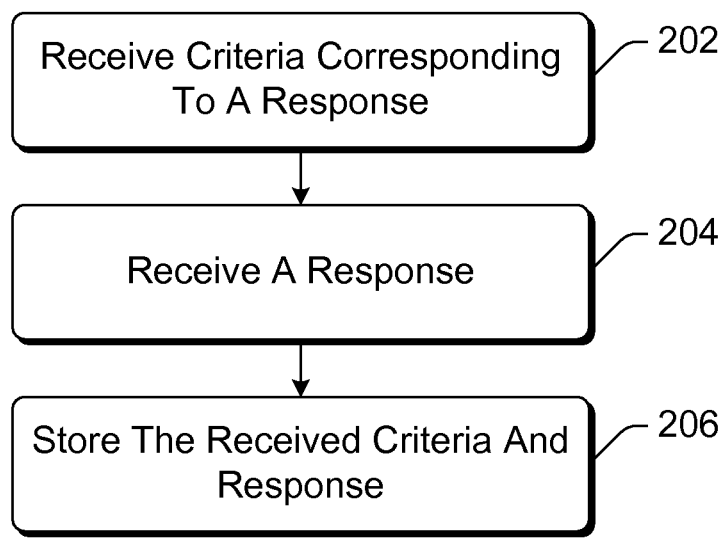
FIG. 2 is a flowchart illustrating an example process for storing pre-determined responses and corresponding criteria in accordance with one or more embodiments.

FIG. 2 is a flowchart illustrating an example process 200 for storing pre-determined responses and corresponding criteria in accordance with one or more embodiments. Process 200 is carried out by a device, such as device 100 of FIG. 1 (e.g., module 118 of FIG. 1), and can be implemented in software, firmware, hardware, or combinations thereof. Process 200 is an example process for storing pre-determined responses and corresponding criteria; additional discussions of storing pre-determined responses and corresponding criteria are included herein with reference to different figures.

In process 200, criteria corresponding to a response are received (act 202). As discussed above, this criteria can be received from a user or alternatively other sources. Also as discussed above, the criteria corresponding to a particular response includes both a type of communication and a user signal.

A response is also received (act 204). As discussed above, this response can be a variety of different types of responses, such as a voice response, a message response, and so forth. This response will be returned to another device as the pre-determined response when the criteria received in act 202 are satisfied.

The received criteria and the response are stored (act 206). The received criteria and response correspond to one another, so if the criteria are subsequently satisfied then the response can be returned as the pre-determined response in response to a communication from another device. The received criteria and response are stored, for example, in response collection 120 of FIG. 1.

Figure 3:
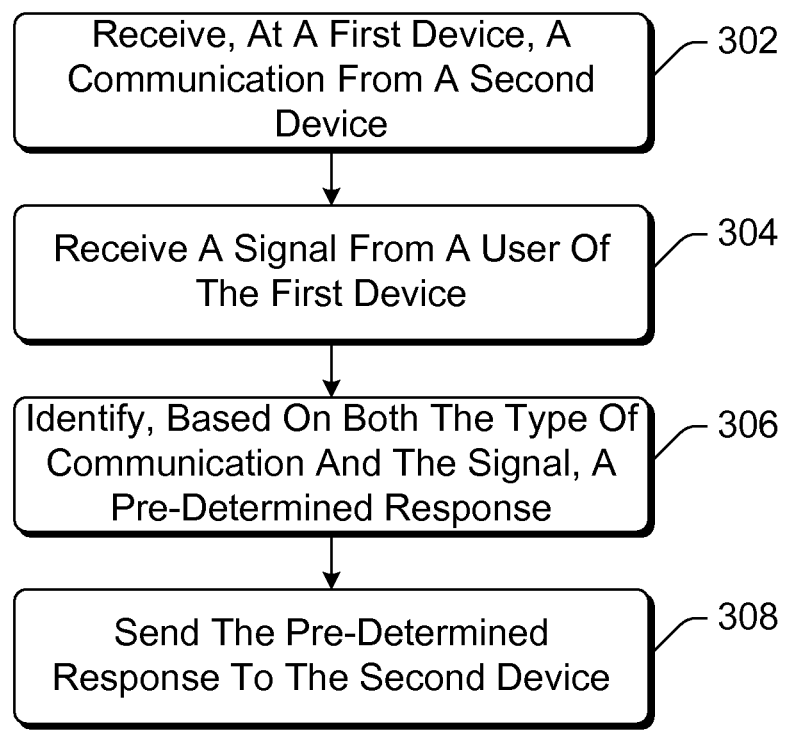
FIG. 3 is a flowchart illustrating an example process for sending pre-determined responses in accordance with one or more embodiments.

FIG. 3 is a flowchart illustrating an example process 300 for sending pre-determined responses in accordance with one or more embodiments. Process 300 is carried out by a device, such as device 100 of FIG. 1 (e.g., modules 116 and 114 of FIG. 1), and can be implemented in software, firmware, hardware, or combinations thereof. Process 300 is an example process for sending pre-determined responses; additional discussions of sending pre-determined responses are included herein with reference to different figures.

In process 300, at a first device a communication is received from a second device (act 302). As discussed above, this communication can be of a variety of different types, such as a voice communication or a message communication. Also as discussed above, in response to this received signal the device implementing process 300 can notify the user of the first device of the communication.

A signal is also received from a user of the first device (act 304). This user signal can take a variety of different forms as discussed above. This user signal is typically made by the user in response to the notification of the communication that was presented to the user.

Based on both the type of communication received and the user signal received, a pre-determined response is identified (act 306). As discussed above, the type of communication received and the user signal received are compared to previously stored criteria. This pre-determined response identified in act 306 is the pre-determined response that corresponds to the criteria satisfied by both the type of communication received and the signal received. This previously-determined response is sent to the second device (act 308).

It is to be appreciated that the pre-determined responses for wireless devices discussed herein can allow the user to quickly and easily return a pre-determined response to someone calling, messaging, etc. the user. For example, the user could be in a meeting, feel his or her phone vibrating (indicating an incoming call), and input a particular user signal to have the desired pre-determined response sent to the caller. This particular user signal can be input without the user ever needing to disrupt the meeting by answering the phone call, or even looking to see who is calling or removing his or her wireless device from its case.

Figure 4:
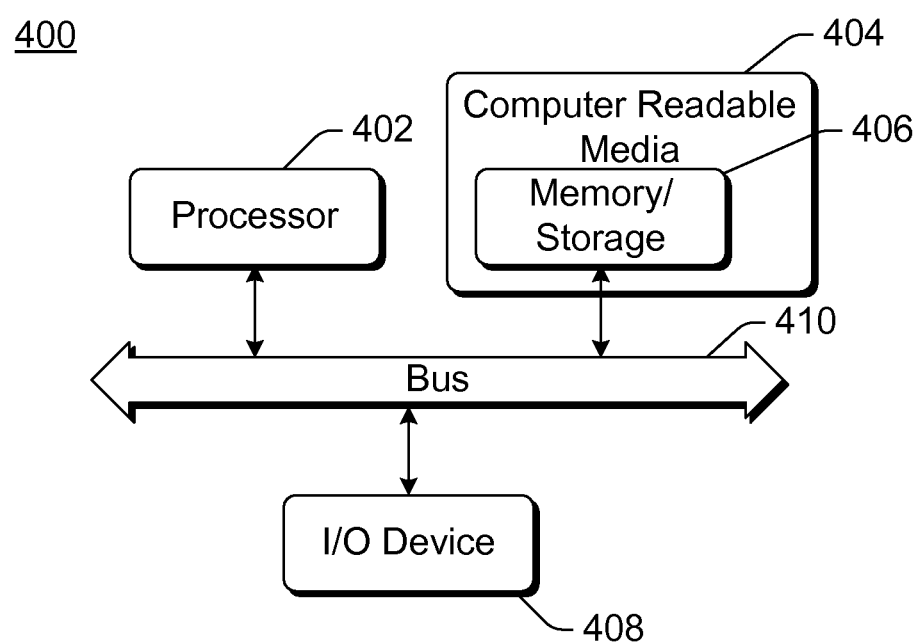
FIG. 4 illustrates an example computing device that can be configured to implement the pre-determined responses for wireless devices in accordance with one or more embodiments.

FIG. 4 illustrates an example computing device 400 that can be configured to implement the pre-determined responses for wireless devices in accordance with one or more embodiments. Computing device 400 can be, for example, a device 100 or a device 102 of FIG. 1.

Computing device 400 includes one or more processors or processing units 402, one or more computer readable media 404 which can include one or more memory and/or storage components 406, one or more input/output (I/O) devices 408, and a bus 410 that allows the various components and devices to communicate with one another. Computer readable media 404 and/or I/O device(s) 408 can be included as part of, or alternatively may be coupled to, computing device 400. Bus 410 represents one or more of any of several types of bus structures, including a memory bus or memory controller, a peripheral bus, an accelerated graphics port, and a processor or local bus using any of a variety of bus architectures. Bus 410 can include wired and/or wireless buses.

Memory/storage component 406 represents one or more computer storage media. Component 406 can include volatile media (such as random access memory (RAM)) and/or nonvolatile media (such as read only memory (ROM), Flash memory, optical disks, magnetic disks, and so forth). Component 406 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processing unit(s) 402. It is to be appreciated that different instructions can be stored in different components of computing device 400, such as in a processing unit 402, in various cache memories of a processing unit 402, in other cache memories of device 400 (not shown), on other computer readable media, and so forth. Additionally, it is to be appreciated that the location where instructions are stored in computing device 400 can change over time.

One or more input/output devices 408 allow a user to enter commands and information to computing device 400, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The term module as used herein generally represents software, firmware, hardware, or combinations thereof. In the case of a software implementation, the module represents program code that performs specified tasks when executed on a processor (e.g., CPU or CPUs). The program code can be stored in one or more computer storage media, further description of which may be found with reference to FIG. 4. The features of the pre-determined responses for wireless devices techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a wireless device, the method comprising:
   receiving criteria including both a type of communication and a user signal;
   receiving a response to be stored as a pre-determined response;
   storing, in a response collection including multiple pre-determined responses and corresponding criteria for each of the multiple pre-determined responses, both the pre-determined response and the criteria for subsequent sending of the pre-determined response when a communication and user signal satisfying the criteria are received, the stored criteria including both the type of communication and the user signal;
   receiving a communication of the type from a different device;
   receiving the user signal from a user of the wireless device;
   identifying, based at least in part on both the type and the user signal, the pre-determined response; and
   sending, to the different device, the pre-determined response.

2. A method as recited in claim 1, wherein receiving the response comprises receiving the response from the user, and wherein receiving the criteria comprises:
   sensing user input received between a begin record user input and an end record user input; and
   using the sensed user input as the user signal.

3. A method as recited in claim 1, further comprising:
   receiving additional criteria including both an additional type of communication and an additional user signal;

receiving an additional response; and storing, in the response collection, both the additional response and the additional criteria for subsequent sending of the additional response if the additional criteria are satisfied.

4. A method as recited in claim 3, the response collection including at the same time both the additional response and the additional criteria for subsequent sending of the additional response as well as both the pre-determined response and the criteria for subsequent sending of the pre-determined response, wherein the type of communication comprises a voice call, the additional type of communication comprises a message, and the user signal and the additional user signal are both the same signal.

5. A method as recited in claim 3, wherein both the type of communication and the additional type of communication comprises a same type of communication, and wherein the user signal and the additional user signal are two different signals.

6. A method as recited in claim 1, wherein the user signal comprises a symbol input by the user via a touchscreen of the wireless device.

7. A method as recited in claim 1, wherein the user signal comprises a particular physical feedback input to the wireless device.

8. A method as recited in claim 1, wherein the user signal comprises a user-selected user signal.

9. One or more computer storage media devices having stored thereon multiple instructions that, when executed by one or more processors of a first wireless device, cause the one or more processors to:

receive at the first wireless device, from a second device, a communication of a first type;

receive a first signal from a user of the first wireless device;

identify from a response collection in which multiple pre-determined responses and corresponding criteria for each of the multiple pre-determined responses are stored, based at least in part on both the first type and the first signal, a pre-determined response to the communication, the stored criteria for a corresponding pre-determined response including both the first type of communication and the first user signal; and send, to the second device, the pre-determined response.

10. One or more computer storage media devices as recited in claim 9, the instructions further causing the one or more processors to:

receive a communication of a second type from a third device;

receive a second signal from the user;

identify from the response collection a second pre-determined response based on both the second type and the second signal; and send, to the third device, the second pre-determined response.

11. One or more computer storage media devices as recited in claim 10, wherein the first type is a voice call and the second type is a message.

12. One or more computer storage media devices as recited in claim 10, the response collection including at the same time both the pre-determined response and the first signal as well as both the second pre-determined response and the second signal, wherein the first signal and the second signal are the same user signal.

13. One or more computer storage media devices as recited in claim 9, the first signal comprising a particular one or more keys of the first device being pressed.

14. One or more computer storage media devices as recited in claim 9, the first signal comprising a particular input on a touchscreen of the first device.

15. One or more computer storage media devices as recited in claim 9, the first signal comprising a tapping of the first device.

16. A wireless device comprising:

a response generation module to:
receive criteria including both a first type of communication and a first user signal;
receive a response to be stored as a pre-determined response; and
store, in a response collection maintaining multiple pre-determined responses and corresponding criteria for each of the multiple pre-determined responses, both the pre-determined response and the criteria, the stored criteria including both the first type of communication and the first user signal; and a matching module to:
receive, from a different device, a communication of the first type;
receive the first user signal from a user of the wireless device;
identify from the response collection, based at least in part on both the first type and the first user signal, the pre-determined response; and
send, to the different device, the pre-determined response.

17. A wireless device as recited in claim 16, wherein the matching module is further to:
receive, from the different device, a second communication of a second type;
receive a second user signal from the user;
identify from the response collection, based at least in part on both the second type and the second user signal, a second pre-determined response; and
send, to the different device, the second predetermined response.

18. A wireless device as recited in claim 17, the response collection storing concurrently both the pre-determined response and the first user signal as well as both the second pre-determined response and the second user signal.

19. A wireless device as recited in claim 18, the response generation module being further to receive one or more pre-determined responses and corresponding criteria from another device used by the user to generate the one or more pre-determined responses and corresponding criteria, and store the one or more pre-determined responses and corresponding criteria as part of the response collection.

20. A wireless device as recited in claim 16, wherein the first user signal comprises a symbol input by the user via a touchscreen of the wireless device.

* * * * *